March 10, 1970     D. R. LIGH     3,499,342
MULTIPLE MOTION CONVERTING ACTUATOR
Filed March 11, 1968     3 Sheets-Sheet 1

INVENTOR
David R. Ligh
BY
Michael S. Striker
ATTORNEY

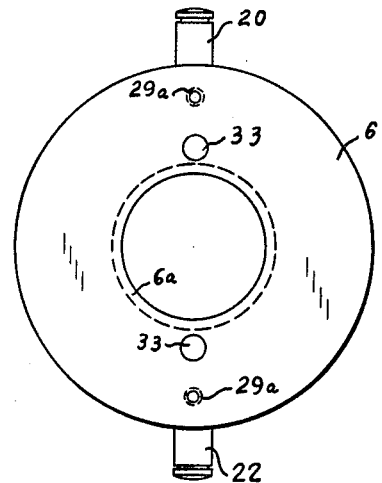
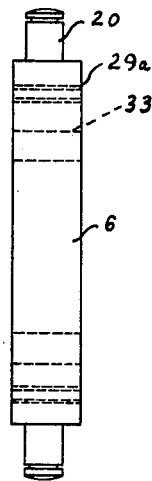
FIG. 2          FIG. 2a
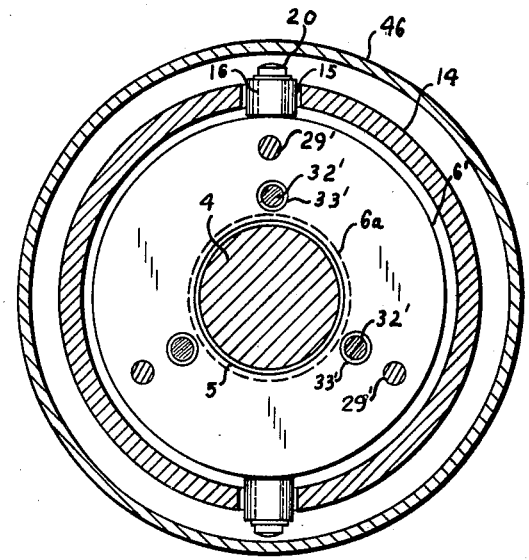
FIG. 3

March 10, 1970     D. R. LIGH     3,499,342
MULTIPLE MOTION CONVERTING ACTUATOR
Filed March 11, 1968     3 Sheets-Sheet 3

INVENTOR
David R. Ligh
BY Michael S. Striker
ATTORNEY

United States Patent Office 3,499,342
Patented Mar. 10, 1970

3,499,342
MULTIPLE MOTION CONVERTING ACTUATOR
David R. Ligh, 193 Main St., Madison, N.J. 07940
Filed Mar. 11, 1968, Ser. No. 712,232
Int. Cl. F16h 39/00
U.S. Cl. 74—410
24 Claims

ABSTRACT OF THE DISCLOSURE

Two hydraulic pistons subjected to the same fluid pressure, drive a pair of input means connected by female threads with male thread on an output shaft in the same direction so that the same is turned while the pressure forces are evenly distributed over the contacting thread surfaces.

Background of the invention

The present invention relates to motion converting actuators of the type in which a rectilinear motion is transformed into a rotary motion. It is known to use a hydraulic piston for moving an input member having a female thread along a straight path so that an output shaft having a male thread is rotated.

Actuators of this type have many industrial applications and are particularly used for the operation of large hatch covers mounted on the decks of ships.

The mechanical conversion of motion and energy by actuators of this type is limited by the permissible contact pressure between the surfaces of the engaged female and male threads. Soft material will permit only a relatively low pressure, while hard materials can be subjected to greater force. If the actuator is operated at a low speed, higher contact pressures are permissible.

In order to obtain a comparatively low contact pressure between the engaging thread faces, it has been proposed to use a female thread of great axial length. However, since the male thread of the output shaft, and the female thread of the input member have to be made on different and distinct machines it is not possible to obtain a complete and perfect contact along the entire length of the engaged thread surfaces. One end of the female thread will transmit all the pressure while the other end of the thread will have some play and transmit no pressure. Therefore, it is neither economical nor practical to transmit great forces by actuators of this type according to the prior art.

Summary of the invention

It is one object of the invention to provide a motion converting actuator in which large areas of the surfaces of meshing female and male threads are in full contact so that the specific pressure acting on the contacting surfaces is comparatively small in relation to the transmitted force.

Another object of the invention is to rotate an output means by a plurality of input means moving in synchronism.

Another object of the invention is to provide a female thread of short axial length on each of the input means meshing with a male thread on the output means so that the force transmitting thread portions are short and have fully abutting contact surfaces.

Another object is to drive two narrow input means having female threads by two pistons subjected to the same fluid pressure in a common cylinder.

Another object is to provide a motion converting actuator capable of transforming linear motion into rotary motion and rotary motion into linear motion.

With these objects in view, one embodiment of the invention comprises supporting means, first means, preferably including an output shaft, having a first guide portion, preferably a male thread, and being mounted for rotation; and a plurality of second means, preferably input means in the form of adjacent torque heads having second guide portions, preferably female threads, and being mounted for axial movement, the first and second guide portions having abutting first and second contact surfaces extending along a helix.

When a plurality of drive means, preferably hydraulic pistons disposed in a common cylinder chamber, are respectively connected with the second means for moving the same in synchronism in the same axial direction, a plurality of torques is transmitted between the first and second guide portions, and thereby to the first means. Consequently, the first and second contact surfaces of the first and second helical guide portions are in full contact, and the pressure forces are evenly distributed over the same.

In the preferred embodiment of the invention, a cylinder of a hydraulic motor slidingly receives an annular piston and a central piston located in the central opening of the annular piston. Two sets of tie rods respectively connect the annular piston and the central piston with two narrow input means provided with axially short female threads. The input means include substantially circular plates, and follower means projecting from the circular periphery of the plates into straight guide slots extending in axial direction in a cylindrical wall of the supporting means.

In one embodiment of the invention, cylinders are provided at both ends of the cylindrical wall and house pairs of pistons which are respectively connected by tie rods to the plates of the two input means. This embodiment has the advantage that the meshing threads are not located in a space which is filled with the pressure liquid used for operating the pistons.

In another embodiment, however, the pressure fluid fills the entire housing in which the pistons form two cylinder chambers, each of which can be supplied with a pressure fluid for moving the two input means in opposite axial directions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 2 is a front view of an input means or torque head used in the embodiment of FIG. 1;

FIG. 2a is a side view of the input means shown in FIG. 2;

FIG. 3 is a cross section taken on line III—III of FIG. 1, but illustrating a modification of the embodiment of FIG. 1.

Description of the preferred embodiments

Figure 1:
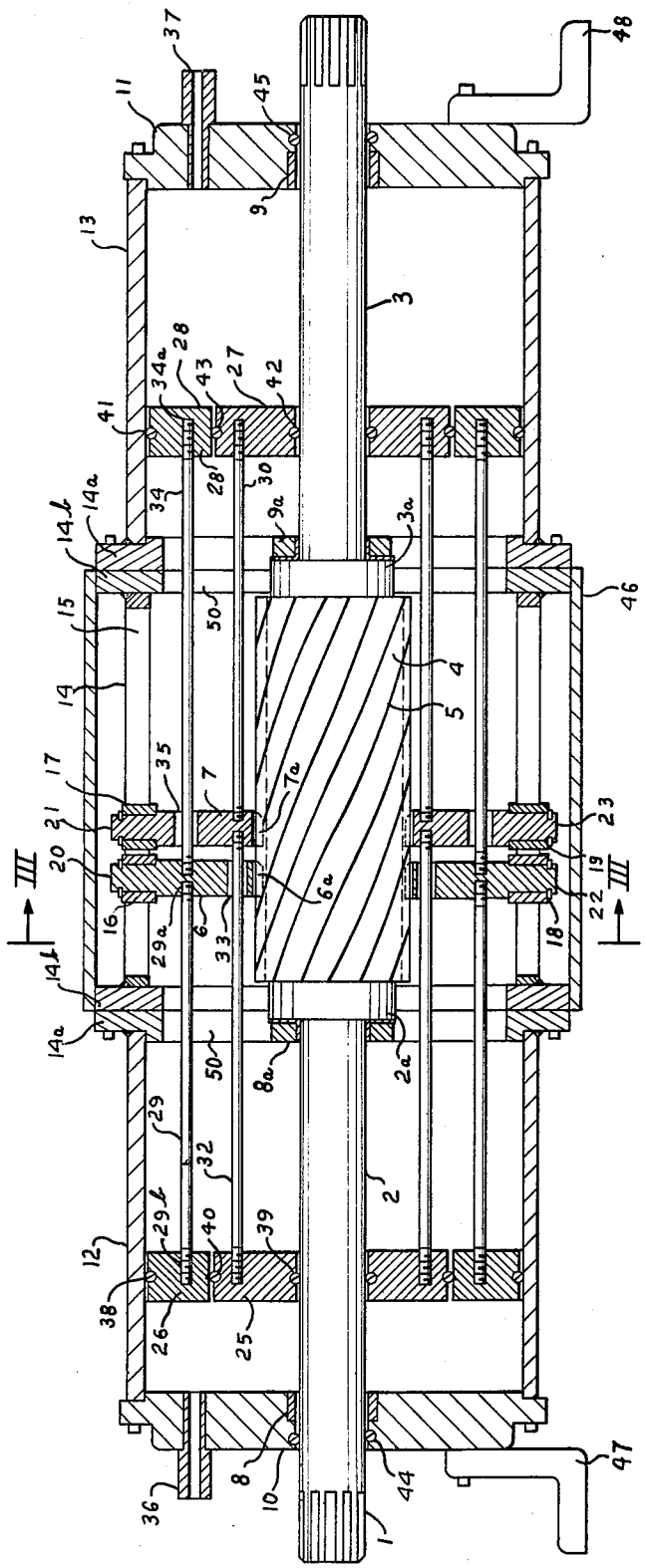
FIG. 1 is an axial sectional view illustrating one embodiment of the invention.

Referring first to FIGS. 1 to 3, a shaft 1 has two shaft end portions 2 and 3, and a central portion 4 of greater diameter having a male helical thread 5. Shaft end portions 2 and 3 are mounted in bearings 8 and 9 in closure walls 10 and 11 which are end plates of cylinders 12 and 13. Shaft 1 has also flanges 2a and 3a respectively abutting thrust bearings 8a and 9a provided in plates 14a secured to the inner ends of cylinders 12 and 13 by welding, and secured by screws, not shown, to plates 14b to which a cylindrical wall 14 having straight slots 15 extending in axial direction of shaft 1 is secured by welding. A tubular housing part 46 is also secured to the peripheral rims of the circular plates 14b.

The straight guide slots 15 are diametrically disposed, but it is also possible to provide a greater number of guide slots.

Two torque heads 6 and 7 are provided which have central openings with female threads 6a and 7a meshing with thread 5 on shaft portion 4. Each torque head 6 and 7 has a circular plate and diametrically disposed cam follower means located in the straight guide slots 15. Torque head 6 has radially projecting pins 20 and 22 on which follower rollers 16 and 18 are mounted for turning movement. Torque head 7 has radially projecting pins 21, 23 on which follower rollers 17 and 19 are mounted for rotation. Rollers 16 to 19 roll on the straight axially extending surfaces of slots 15 so that the torque heads are guided for axial movement, but cannot turn. Consequently, axial movement of torque heads 6 and 7 will cause rotation of shaft 1 since torques are transmitted by the female threads 6a and 7a to the male thread 5 of shaft portion 4. Should 180 degrees of rotation be required for a full stroke of the torque heads, the male thread must advance in circumferential direction 180 degrees plus the amount required for the axial thickness of the torque heads 6 and 7.

It is possible to substitute for guide slots 15 and follower means 16 to 23, a cylindrical wall 14 having inner axially extending splines cooperating with corresponding splines on the periphery of the torque heads, as will be described with reference to FIG. 4. Slots 15 are preferably hardened, and due to the cooperation between the hardened surfaces of the slots with the follower rollers, great forces can be transmitted without substantial friction losses. However, hardened slide blocks may be used instead of the rollers.

An annular piston 26 is mounted in cylinder 12 and has a central opening in which a central piston 25 is located. Since shaft portion 2 passes through a central opening in piston 25, the same is also annular. An annular piston 28, and a central annular piston 27 are located in cylinder 13.

An annular sealing ring 38 is located in the gap between the annular piston 26 and the inner surface of cylinder 12. An annular sealing ring 39 seals the gap between the central piston 25 and shaft portion 2. Sealing rings 41 and 42 perform the same function in cylinder 13.

The outer peripheral faces of the central pistons 25 and 27, and the confronting inner annular faces of the annular pistons 26 and 28 are formed with grooves in which flexible sealing rings 40 and 43 are located. Sealing rings 38 to 43 may be so-called O-rings.

The annular piston means 26, 28 and the central piston means 25 and 27 are respectively connected with the two torque heads 6 and 7. Tie rods 29 have threaded ends screwed into corresponding threaded bores 29a and 29b in torque head 6 and annular piston 26. Tie rods 34 have threaded ends respectively threaded into threaded bores 29a in torque head 6 and threaded bores 34a in annular piston 29. Openings extending through torque head 7 permit the passage of tie rods 34.

Tie rods 32 have threaded ends respectively threaded into threaded bores of central piston 25 and threaded bores in torque head 7. Tie rods 30 have threaded ends respectively located in threaded bores in torque head 7 and in central piston 27. Tie rods 32 pass through bores 33 in torque head 6.

FIGS. 2 and 2a clearly show the torque head 6 provided with a pair of diametrically arranged bores 33 and a pair of threaded bores 29a.

In the modified construction of the torque heads shown in FIG. 3, a set of three tie rods 29' and a set of three tie rods 32' are shown. Tie rods 32' pass through three bores 33' in a modified torque head 6'. Sets of three tie rods 34 and 30 are provided for connecting pistons 29 and 27 with the torque heads. FIG. 1 may be considered a sectional view taken along two radial planes defining an angle of 120 degrees in FIG. 3.

Closure plates 10, 11 are provided with inlet and outlet means 36, 37. Pressure fluid controlled by suitable valve means, not shown, can be introduced into one of cylinders 12, 13 while fluid is discharged from the other.

Cylinders 12, 13, 14 with tubular wall 46 form a rigid supporting housing resting on legs 47 and 48.

When pressure fluid is admitted through the port 36 into the chamber formed by pistons 25, 26 in cylinder 12, pistons 25, 26 are moved in synchronism in axial direction towards the right as viewed in FIG. 1. The flexible O-ring 40 maintains the pressure seal, but allows at the same time a small and limited relative movement between pistons 25 and 26 so that the pressure is equalized. Pistons 25 and 26 act through the sets of tie rods 29 and 32 on torque heads 6 and 7, to move the same in axial direction of shaft 1, while the sets of tie rods 34 and 30 displace pistons 29 and 27 so that fluid is discharged through port 37.

The torque heads 6 and 7 are constrained to move in straight axial direction due to the engagement between follower rollers 16 to 19 and the straight guide slots 15. Consequently, the two female thread portions 6a and 7a transmit torques to the male thread 5 of the central shaft portion 4, and shaft 1 is rotated to produce an output torque.

Due to the equalization of the hydraulic pressures acting on pistons 25 and 26, full pressure acts on each torque head 6 and 7, and since the torque heads are narrow in axial direction, the contacting surfaces of the female threads 6a, 7a and male thread 5 fully engage each other and the pressure is uniformly and evenly transmitted between the contacting surfaces which would not be possible if a single torque head having the combined axial length of the two torque heads 6 and 7 would be used.

It is evident that, if pressure fluid is admitted into cylinder 13 through port 37, pistons 27, 28 will operate torque heads 6 and 7 in the same manner, while fluid will be discharged from cylinder 12 by the action of pistons 25, 26 through port 36.

Pistons 25, 27 are piston means or drive means for operating torque head 7, which constitutes an input means. Pistons 26 and 28 are piston means or drive means for operating torque head 6 which constitutes another input means.

The male thread 5 can be considered as a first guide portion, and the female thread 6a and 7a can be considered as second guide portions abutting the first guide portions 5 along first and second contact surfaces extending along a helix having an axis coinciding with the axis of shaft 1. Due to the fact that independent but synchronized driving forces act in axial direction on the input means 6 and 6a, each input means 6 and 7 is fully effective to transmit a torque to the central shaft portion 4.

Due to the fact that at least two torque heads are provided, full pressure acts on each torque head and each torque head delivers a full output torque. The effective areas of pistons 25, 26, 27, 28 are the same, and it is advantageous to make the torque heads 6 and 7 of plates narrow in axial direction so that each of the female threads 6a and 7a is short whereby the respective threads can be very accurately machined and full contact pressure throughout the engaging thread surfaces will be achieved.

Irrespective of the direction in which the pistons torque together, the angle of the helical thread is sufficient to assure movement of the torque heads in slightly spaced position so that it is not possible for one torque head to block movement of the other.

Due to the use of two single acting cylinders 12 and 13, the pressure fluid is confined in cylinder chambers formed between pistons 25, 26 and closure plate 10 and pistons 27, 28 and closure plate 11. The space within cylindrical wall 14, where the threads are located, is separated by the pistons and sealing rings from the cylinder chambers, and consequently the pressure fluid cannot enter this space. Since the hydraulic pressure fluid does not have good lubricating properties, a contamination of the threads with the pressure fluid is avoided, and a high-pressure grease can be used on the contact surfaces of the threads permitting the transmission of great torques producing high contact pressure between the contacting surfaces of the threads. The high permissible contact pressure results in a greater torque output by output shaft 1, or in a small and compact apparatus capable of transmitting the same torque as a larger apparatus according to the prior art.

Figure 4:
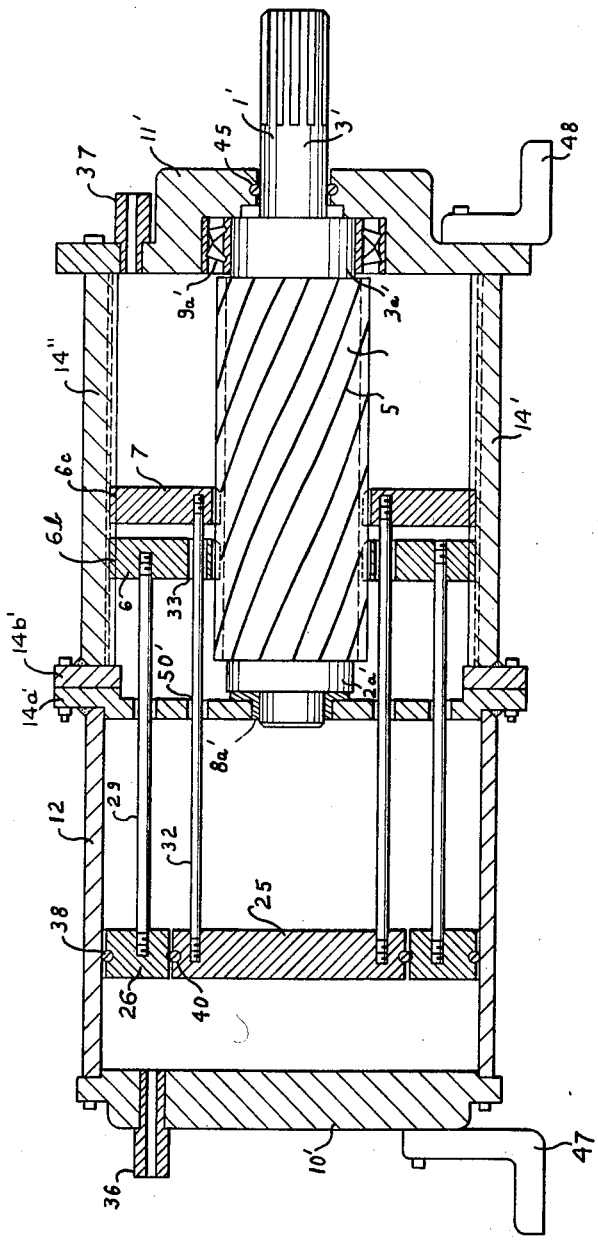
FIG. 4 illustrates another embodiment of the invention.

The embodiment of FIG. 4 is constructed in accordance with the same principle as the embodiment of FIG. 1.

Two torque heads 6 and 7, serving as input means are connected by a first set of tie rods 29 to an annular piston 26, and by a second set of tie rods 32 to a central piston 25. The tie rods have threaded end portions screwed into threaded bores of the pistons, and tie rods 32 pass through openings 33 in torque head 6 which is located between torque head 7 and piston 25 which is connected by tie rod 32 to torque head 7.

A cylindrical wall 14' surrounds torque heads 6 and 7 and has axially extending straight splines 14 engaged by matching splines 6b and 6c on the periphery of torque heads 6 and 7. Splines 14", 6b, 6c constitute guide means for the torque heads and perform the function of slot 15 and follower means 16 to 23 of the embodiment of FIG. 1.

Each of the torque heads 6 and 7 is a plate narrow in axially direction and formed with a central bore provided with female thread meshing with the male thread 5 of shaft portion 4. Shaft 1' has one output portion 3' and a flange portion 3a' of greater diameter forming a shoulder with the threaded shaft portion 4. A thrust bearing 9a' supports shaft 1' against axial movement. The other end portion of shaft 1' includes a flange 2a' abutting a thrust bearing 8a' in a transverse wall 14a' which is provided with openings 50' for the passage of tie rods 29 and 32. Slots 50 as shown in wall 14a of FIG. 1 may be substituted for each pair of openings 50'.

Only one cylinder 12 is provided, and welded to wall 14a' which is secured to an annular wall 14b' welded to cylindrical wall 14'. Closure walls 10' and 11', respectively, close cylinder 12 and cylindrical wall 14'. A sealing ring 45 seals shaft end portion 3' in closure wall 9a'.

As is in the embodiment of FIG. 1, a sealing ring 38 is provided between the annular piston 26 and the inner surface of cylinder 12 and a sealing ring 40 is mounted between the confronting circular peripheral surfaces of pistons 25 and 26, connecting the same for very slight relative displacement. Inlet and outlet means, 36, 37 on closure walls 10' and 11' communicate with the cylinder chambers formed by pistons 25, 26 and sealing rings 38, 40 in the cylinder housing 10', 12, 14' and 11', which is completely filled with a liquid, such as oil.

During operation, pressure fluid is supplied through port 36 and drives pistons 25, 26 in substantial synchronism together with torque heads 6 and 7 which are guided by the splines 14" to move along a straight path parallel to the axis of shaft 1' so that two torques are transmitted between the two female threads of the torque heads 6, 7 and the male thread 5 of the threaded shaft portion 4. The valves, not shown, by which the pressure liquid is controlled, permit discharge through port 37 so that shaft 1' rotates in one direction. When pressure liquid is admitted through port 37, it acts on the other side of pistons 25, 26 since the construction of transverse walls 14a' and of the torque heads 6 and 7 permits the passage of the liquid. Consequently the torque heads are moved in substantial synchronism to the left as viewed in FIG. 4, turning shaft 1' in the opposite direction, while liquid is discharged from port 36. The entire mechanism is immersed in the same pressure fluid and special oil is needed to provide lubrication of the splines.

It will be understood that each of the elements described above, or two or more together, may also find a useful application in other types of motion converting actuators differing from the types described above.

While the invention has been illustrated and described as embodied in a motion converting actuator having a plurality of torque heads driven by a plurality of hydraulic pistons subjected to the same fluid pressure and moving in synchronism, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention.

What is claimed as new and desired to be protected by Letters Patent is set forth in the accompanying claims.

I claim:

1. Multiple motion converting actuator comprising, in combination, supporting means; first means mounted on said supporting means for rotation about an axis and including one first guide portion having a first contact surface extending along a helix; second means including a plurality of torque heads having second guide portions, respectively, with second contact surfaces extending along said helix and abutting portions of said first contact surface, respectively and thereby being adapted to move simultaneously in the same axial direction along said first contact surface; and operating means for moving one of said first and second means so that a plurality of torques is transmitted between said first and second guide portions and thereby to the respective other means for moving the latter.

2. Motion converting actuator as claimed in claim 1 wherein said operating means include drive means connected with said torque heads for moving the same together in synchronism in said axial direction so that a plurality of torques is transmitted from said torque heads and said second guide portions to said first guide portion and to said first means.

3. Motion converting actuator as defined in claim 2 wherein said supporting means include cylinder means; wherein said drive means includes a plurality of piston means located in said cylinder means, said cylinder means having inlet and outlet means for a pressure fluid disposed so that said piston means are subjected to the same fluid pressure in said cylinder means and move in synchronism, said piston means being respectively connected with said torque heads for moving the same together in synchronism in the same direction.

4. Motion converting actuator as claimed in claim 1 wherein said supporting means include straight guide means parallel to said axis; and wherein said torque heads are adjacent and have follower means engaged and guided by said straight guide means.

5. Motion converting actuator as claimed in claim 4 wherein said guide means is a tubular wall having straight guide slots for guiding said follower means of said torque heads; wherein said first means is surrounded by said torque heads, and the latter are surrounded by said tubular wall; and wherein each of said torque heads is narrow in axial direction and has said follower means radially projecting from the outer periphery thereof into said straight guide slots.

6. Motion converting actuator as claimed in claim 1 wherein said torque heads are disposed closely spaced in said axial direction from each other on said first contact surface so that said portions of said first contact surface are closely spaced from each other.

7. Motion converting actuator as claimed in claim 1 wherein said first guide portion is a continuous male thread and said first contact surface is a continuous helical thread surface; and wherein said second guide portions are female threads meshing with said male thread.

8. Motion converting actuator as claimed in claim 1 wherein said supporting means include cylinder means having inlet means and outlet means for a pressure fluid; and wherein said operating means include a plurality of pistons located in said cylinder means and forming a chamber in the same so that pressure fluid in said chamber acts on the same side of said pistons and moves the same together in axial direction.

9. Motion transmitting actuator as claimed in claim 8 including resilient sealing means between said pistons mechanically connecting the same for limited relative movement for equalizing forces transmitted from said torque heads to said pistons, respectively.

10. Multiple motion converting actuator comprising, in combination, supporting means including cylinder means having inlet and outlet means for a pressure fluid, and a cylindrical wall having a common axis with said cylinder means and including straight guide means parallel with said axis; an output shaft mounted on said supporting means for rotation about said axis and having one male thread located within said cylindrical wall coaxial with the same; at least two input means including adjacent torque heads narrow in axial direction, each torque head having a central bore with a female thread in threaded engagement with said male thread, and also having radially projecting follower means guided by said guide means during movement of said input means in axial direction; at least two piston means located in said cylinder means and subjected to the same fluid pressure; and at least two connecting means connecting said two piston means with said torque heads of said two input means, respectively, so that when pressure fluid drives said piston means and thereby said input means in the same axial direction, two torques are transmitted by said female threads to said male thread of said output shaft for rotating the same while the surfaces of said female and male threads are in full contact whereby pressure forces are evenly distributed over the contacting surfaces of said threads.

11. Motion converting actuator as claimed in claim 10 wherein one of said piston means includes an annular piston having a central opening, and the other piston means includes a central piston located in said central opening so that said pistons are subjected to the same fluid pressure in said cylinder means and move in synchronism.

12. Motion converting actuator as claimed in claim 11 wherein said pistons form a circular gap bounded by an inner circular face of said annular piston and by an outer circular face of said central piston, said circular faces having each a circular groove; and an annular flexible sealing ring located in said grooves for sealing said gap and for connecting said pistons for limited relative movement in axial direction.

13. Motion converting actuator as claimed in claim 10 wherein said cylinder means include two cylinders located at the axial ends of said cylindrical wall; wherein one of said piston means includes two annular pistons located in said cylinders, respectively, and the other piston means includes two central pistons located in said cylinders, respectively, surrounded by said annular pistons, respectively; wherein one of said connecting means includes two sets of tie rods for connecting said two annular pistons with one of said torque heads, and the other connecting means includes two sets of tie rods for connecting said two central pistons with the other torque head.

14. Motion converting actuator as claimed in claim 13 wherein each of said torque heads includes a plate having bores therethrough for the passage of tie rods secured to the respective other plate, and wherein said guide means include slots in said cylindrical wall.

15. Motion converting actuator as claimed in claim 13 wherein said annular and central pistons of each of said two piston means form cylinder chambers in said two cylinders, respectively; wherein said inlet and outlet means communicate with said cylinder chambers; wherein each of said annular pistons forms two annular gaps with said central piston and with said cylinder chamber, respectively; and an annular sealing ring located in each of said annular gaps so that the space between said pistons surrounded by said cylindrical wall where said torque heads and said male and female threads are located is not filled by the pressure fluid supplied through said inlet means.

16. Motion converting actuator as claimed in claim 10 wherein said cylinder means include a cylinder located at one axial end of said cylindrical wall and a closure closing the other end of the same; wherein said guide means are splines on the inner surface of said cylindrical wall; wherein said piston means include an annular piston and a central piston surrounded by said annular piston, said pistons being located in said cylinder and forming a first cylinder chamber in said cylinder and a second cylinder chamber in said cylindrical wall closed by said closure, said inlet and outlet means communicating with said first and second cylinder chambers so that pressure fluid admitted into said chambers moves said pistons.

17. Motion converting actuator as claimed in claim 16 wherein each of said connecting means includes a set of tie rods respectively connecting said torque heads of said two input means with said annular and central pistons.

18. Motion converting actuator as claimed in claim 17 wherein said annular piston forms an annular gap with said central piston; and including an annular flexible ring located in said gap and connecting said pistons for limited relative movement.

19. Motion converting actuator as claimed in claim 17 wherein one of said plates is located between the other plate and said pistons and is formed with bores for the tie rods which connect the other plate with the respective piston.

20. Multiple motion converting actuator, comprising, in combination, supporting means including cylinder means; first means having a first guide portion and mounted on said supporting means for rotation about an axis; second means including a plurality of torque heads having second guide portions, respectively, and mounted on said supporting means for movement in the direction of said axis, said first and second guide portions, respectively, having abutting first and second contact surfaces extending along a helix having an axis coinciding with said axis; and operating means for moving one of said means so that a plurality of torques are transmitted between said first and second guide portions and thereby to the other means for moving the latter so that said torque heads move in synchronism whereby pressure forces are evenly distributed over said contact surfaces, said operating means including a plurality of piston means in said cylinder means, one of said piston means including at least one annular piston formed with a central opening, and another piston means including at least one central piston located in said central opening, said annular piston and said central piston being connected with said torque heads, respectively, for moving the same in said axial direction; said cylinder means having inlet means and outlet means for a pressure fluid disposed so that said annular and central pistons are subjected to the same fluid pressure in said cylinder means and move together and also together with said torque heads in synchronism in said axial direction.

21. Motion transmitting actuator as claimed in claim 20 wherein said central piston defines with said annular piston an annular gap; and wherein said piston means include a flexible annular sealing ring located in said gap and connecting said pistons for limited relative movement.

22. Multiple motion converting actuator, comprising, in combination, supporting means including cylinder means having inlet means and outlet means; first means mounted on said supporting means for rotation about an axis, said first means including an output shaft having a male thread; second means including a plurality of torque heads, each torque head including a plate formed with a central opening having female threads engaging said male thread, said male and female threads having contact surfaces located along a helix having an axis coinciding with said axis; and operating means for moving said torque heads and including a plurality of piston means located in said cylinder means and being subjected to the same fluid pressure for moving together in synchronism, said piston means being respectively connected with said torque heads for moving the same together in synchronism in axial direction so that a plurality of torques are transmitted to said output shaft for turning the latter whereby pressure forces are evenly distributed over said male and female threads.

23. Motion converter as claimed in claim 22 wherein said second means includes a plurality of sets of tie rods, said sets being secured to said plates and to said piston means, respectively, and extending parallel to said axis.

24. Motion converting actuator as claimed in claim 23 wherein said cylinder means has at least one cylindrical chamber coaxial with said axis; wherein one of said piston means includes an annular piston forming a central opening and being located in said cylinder chamber for sliding movement, and the other piston means includes a central piston located in said central opening; and wherein one of said plates is located between said pistons and the other plate and is formed with openings therethrough through which the tie rods secured to the other plate pass to the respective piston.

References Cited
UNITED STATES PATENTS

| | | | |
|---|---|---|---|
| 3,133,476 | 5/1964 | Geyer | 92—31 |
| 3,187,592 | 6/1965 | Geyer | 92—33 X |
| 3,255,806 | 6/1966 | Meyer et al. | 92—33 X |
| 3,339,463 | 9/1967 | Updegrave | 92—31 |
| 3,391,722 | 7/1968 | Ligh | 92—31 X |

LEONARD H. GERIN, Primary Examiner

U.S. Cl. X.R.

74—89.15, 424.8; 91—175; 92—33